United States Patent
Gentle et al.

(10) Patent No.: US 8,370,515 B2
(45) Date of Patent: Feb. 5, 2013

(54) PACKET PRIORITIZATION AND ASSOCIATED BANDWIDTH AND BUFFER MANAGEMENT TECHNIQUES FOR AUDIO OVER IP

(75) Inventors: Christopher R. Gentle, Sydney (AU); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 376 days.

(21) Appl. No.: 12/748,094

(22) Filed: Mar. 26, 2010

(65) Prior Publication Data

US 2010/0182930 A1 Jul. 22, 2010

Related U.S. Application Data

(62) Division of application No. 12/027,790, filed on Feb. 7, 2008, now Pat. No. 8,015,309, which is a division of application No. 10/262,621, filed on Sep. 30, 2002, now Pat. No. 7,359,979.

(51) Int. Cl.
*G06F 15/16* (2006.01)
(52) U.S. Cl. .................... 709/231; 709/224; 709/238
(58) Field of Classification Search ............... 709/231, 709/238, 223–224
See application file for complete search history.

(56) References Cited

U.S. PATENT DOCUMENTS

| | | | |
|---|---|---|---|
| 4,791,660 A | 12/1988 | Oye et al. | |
| 5,067,127 A | 11/1991 | Ochiai | |
| 5,206,903 A | 4/1993 | Kohler et al. | |
| 5,506,872 A | 4/1996 | Mohler | |
| 5,594,740 A | 1/1997 | LaDue | |
| 5,604,786 A | 2/1997 | Engelke et al. | |
| 5,724,405 A | 3/1998 | Engelke et al. | |
| 5,724,416 A | 3/1998 | Foladare et al. | |
| 5,802,058 A | 9/1998 | Harris et al. | |

(Continued)

FOREIGN PATENT DOCUMENTS

| | | |
|---|---|---|
| CA | 2319655 | 6/2001 |
| EP | 0982920 | 3/2000 |

(Continued)

OTHER PUBLICATIONS

Notice of Allowance for U.S. Appl. No. 12/027,790, mailed Apr. 29, 2011.

(Continued)

*Primary Examiner* — Philip B Tran
(74) *Attorney, Agent, or Firm* — Sheridan Ross P.C.

(57) ABSTRACT

The present invention is directed to voice communication devices in which an audio stream is divided into a sequence of individual packets, each of which is routed via pathways that can vary depending on the availability of network resources. All embodiments of the invention rely on an acoustic prioritization agent that assigns a priority value to the packets. The priority value is based on factors such as whether the packet contains voice activity and the degree of acoustic similarity between this packet and adjacent packets in the sequence. A confidence level, associated with the priority value, may also be assigned. In one embodiment, network congestion is reduced by deliberately failing to transmit packets that are judged to be acoustically similar to adjacent packets; the expectation is that, under these circumstances, traditional packet loss concealment algorithms in the receiving device will construct an acceptably accurate replica of the missing packet. In another embodiment, the receiving device can reduce the number of packets stored in its jitter buffer, and therefore the latency of the speech signal, by selectively deleting one or more packets within sustained silences or non-varying speech events. In both embodiments, the ability of the system to drop appropriate packets may be enhanced by taking into account the confidence levels associated with the priority assessments.

11 Claims, 5 Drawing Sheets

U.S. PATENT DOCUMENTS

| | | | | |
|---|---|---|---|---|
| 5,828,747 | A | 10/1998 | Fisher et al. | |
| 5,878,029 | A | 3/1999 | Hasegawa et al. | |
| 5,898,696 | A * | 4/1999 | Proctor et al. | 370/468 |
| 5,905,793 | A | 5/1999 | Flockhart et al. | |
| 5,933,425 | A | 8/1999 | Iwata | |
| 5,946,618 | A | 8/1999 | Agre et al. | |
| 5,953,312 | A | 9/1999 | Crawley et al. | |
| 5,961,572 | A | 10/1999 | Craport et al. | |
| 5,982,873 | A | 11/1999 | Flockhart et al. | |
| 6,002,933 | A | 12/1999 | Bender et al. | |
| 6,021,178 | A | 2/2000 | Locke et al. | |
| 6,038,214 | A | 3/2000 | Shionozaki | |
| 6,058,163 | A | 5/2000 | Pattison et al. | |
| 6,061,431 | A | 5/2000 | Knappe et al. | |
| 6,067,300 | A | 5/2000 | Baumert et al. | |
| 6,073,013 | A | 6/2000 | Agre et al. | |
| 6,088,732 | A | 7/2000 | Smith et al. | |
| 6,122,665 | A | 9/2000 | Bar et al. | |
| 6,163,607 | A | 12/2000 | Bogart et al. | |
| 6,173,053 | B1 | 1/2001 | Bogart et al. | |
| 6,185,527 | B1 | 2/2001 | Petkovic et al. | |
| 6,192,122 | B1 | 2/2001 | Flockhart et al. | |
| 6,212,275 | B1 | 4/2001 | Akhteruzzaman | |
| 6,249,757 | B1 | 6/2001 | Cason | |
| 6,256,300 | B1 | 7/2001 | Ahmed et al. | |
| 6,349,136 | B1 | 2/2002 | Light et al. | |
| 6,374,302 | B1 | 4/2002 | Galasso et al. | |
| 6,381,472 | B1 | 4/2002 | LaMedica, Jr. et al. | |
| 6,381,639 | B1 | 4/2002 | Thebaut et al. | |
| 6,421,425 | B1 | 7/2002 | Bossi et al. | |
| 6,434,628 | B1 | 8/2002 | Bowman-Amuah | |
| 6,453,022 | B1 | 9/2002 | Weinman, Jr. | |
| 6,463,470 | B1 | 10/2002 | Mohaban et al. | |
| 6,463,474 | B1 | 10/2002 | Fuh et al. | |
| 6,469,991 | B1 | 10/2002 | Chuah | |
| 6,490,343 | B2 | 12/2002 | Smith, Jr. et al. | |
| 6,490,556 | B1 | 12/2002 | Graumann et al. | |
| 6,498,791 | B2 | 12/2002 | Pickett et al. | |
| 6,502,131 | B1 | 12/2002 | Vaid et al. | |
| 6,526,140 | B1 | 2/2003 | Marchok et al. | |
| 6,529,475 | B1 | 3/2003 | Wan et al. | |
| 6,529,499 | B1 | 3/2003 | Doshi et al. | |
| 6,532,241 | B1 | 3/2003 | Ferguson et al. | |
| 6,546,082 | B1 | 4/2003 | Alcendor et al. | |
| 6,563,794 | B1 | 5/2003 | Takashima et al. | |
| 6,578,077 | B1 | 6/2003 | Rakoshitz et al. | |
| 6,601,101 | B1 | 7/2003 | Lee et al. | |
| 6,614,900 | B1 * | 9/2003 | Champoux | 379/229 |
| 6,618,368 | B1 | 9/2003 | Tanigawa et al. | |
| 6,628,611 | B1 | 9/2003 | Mochizuki | |
| 6,647,270 | B1 | 11/2003 | Himmelstein | |
| 6,665,637 | B2 | 12/2003 | Bruhn | |
| 6,668,042 | B2 | 12/2003 | Michaelis | |
| 6,678,250 | B1 | 1/2004 | Grabelsky et al. | |
| 6,724,862 | B1 | 4/2004 | Shaffer et al. | |
| 6,725,128 | B2 | 4/2004 | Hogg et al. | |
| 6,727,767 | B2 | 4/2004 | Takada | |
| 6,754,710 | B1 | 6/2004 | McAlear | |
| 6,757,654 | B1 * | 6/2004 | Westerlund et al. | 704/262 |
| 6,760,312 | B1 | 7/2004 | Hitzeman | |
| 6,760,774 | B1 | 7/2004 | Soumiya et al. | |
| 6,765,905 | B2 | 7/2004 | Gross et al. | |
| 6,778,534 | B1 | 8/2004 | Tal et al. | |
| 6,792,092 | B1 | 9/2004 | Michalewicz | |
| 6,798,751 | B1 | 9/2004 | Voit et al. | |
| 6,798,786 | B1 | 9/2004 | Lo et al. | |
| 6,807,564 | B1 | 10/2004 | Zellner et al. | |
| 6,857,020 | B1 | 2/2005 | Chaar et al. | |
| 6,914,964 | B1 | 7/2005 | Levine | |
| 6,954,435 | B2 | 10/2005 | Billhartz et al. | |
| 6,964,023 | B2 | 11/2005 | Maes et al. | |
| 6,973,033 | B1 | 12/2005 | Chiu et al. | |
| 6,980,516 | B1 | 12/2005 | Wibowo et al. | |
| 6,988,133 | B1 | 1/2006 | Zavalkovsky et al. | |
| 7,003,462 | B2 | 2/2006 | Shambaugh et al. | |
| 7,003,574 | B1 | 2/2006 | Bahl | |
| 7,010,097 | B2 | 3/2006 | Zellner et al. | |
| 7,010,581 | B2 | 3/2006 | Brown et al. | |
| 7,031,311 | B2 | 4/2006 | MeLampy et al. | |
| 7,031,327 | B2 | 4/2006 | Lu | |
| 7,043,435 | B2 | 5/2006 | Knott et al. | |
| 7,046,382 | B1 * | 5/2006 | Chu | 370/352 |
| 7,046,646 | B2 | 5/2006 | Kilgore | |
| 7,075,922 | B2 | 7/2006 | Mussman et al. | |
| 7,076,540 | B2 | 7/2006 | Kurose et al. | |
| 7,076,568 | B2 | 7/2006 | Philbrick et al. | |
| 7,089,189 | B2 | 8/2006 | Lipe et al. | |
| 7,099,440 | B2 | 8/2006 | Michaelis | |
| 7,103,542 | B2 | 9/2006 | Doyle | |
| 7,124,205 | B2 | 10/2006 | Craft et al. | |
| 7,165,035 | B2 | 1/2007 | Zinser et al. | |
| 7,170,855 | B1 | 1/2007 | Mo et al. | |
| 7,170,977 | B2 | 1/2007 | Doherty et al. | |
| 7,177,945 | B2 | 2/2007 | Hong et al. | |
| 7,184,434 | B2 | 2/2007 | Ganti et al. | |
| 7,212,969 | B1 | 5/2007 | Bennett | |
| 7,221,660 | B1 | 5/2007 | Simonson et al. | |
| 7,249,024 | B2 | 7/2007 | Engstrom | |
| 7,251,640 | B2 | 7/2007 | Baumard | |
| 7,257,120 | B2 | 8/2007 | Saunders et al. | |
| 7,260,439 | B2 | 8/2007 | Foote et al. | |
| 7,266,499 | B2 | 9/2007 | Surace et al. | |
| 7,269,252 | B2 | 9/2007 | Eran | |
| 7,272,563 | B2 | 9/2007 | Nelson | |
| 7,290,059 | B2 | 10/2007 | Yadav | |
| 7,295,555 | B2 | 11/2007 | Elzur | |
| 7,299,185 | B2 | 11/2007 | Falcon et al. | |
| 7,319,961 | B2 | 1/2008 | Al-Dhubaib et al. | |
| 7,321,591 | B2 | 1/2008 | Daniel et al. | |
| 7,349,851 | B2 | 3/2008 | Zuberec et al. | |
| 7,359,979 | B2 | 4/2008 | Gentle et al. | |
| 7,362,745 | B1 | 4/2008 | Cope et al. | |
| 7,363,371 | B2 | 4/2008 | Kirkby et al. | |
| 7,376,564 | B2 | 5/2008 | Selg et al. | |
| 7,398,212 | B2 | 7/2008 | Yacoub | |
| 7,437,297 | B2 | 10/2008 | Chaar et al. | |
| 7,454,351 | B2 | 11/2008 | Jeschke et al. | |
| 7,474,627 | B2 | 1/2009 | Chheda et al. | |
| 7,489,687 | B2 | 2/2009 | Chavez et al. | |
| 7,496,661 | B1 | 2/2009 | Morford et al. | |
| 7,502,741 | B2 | 3/2009 | Finke et al. | |
| 7,509,260 | B2 | 3/2009 | Cross, Jr. et al. | |
| 7,519,536 | B2 | 4/2009 | Maes et al. | |
| 7,565,415 | B1 | 7/2009 | Markowitz et al. | |
| 7,617,337 | B1 | 11/2009 | Beck et al. | |
| 2001/0012993 | A1 | 8/2001 | Attimont et al. | |
| 2001/0036157 | A1 | 11/2001 | Blanc et al. | |
| 2001/0039210 | A1 | 11/2001 | ST-Denis | |
| 2002/0026310 | A1 * | 2/2002 | Mochida et al. | 704/201 |
| 2002/0080808 | A1 | 6/2002 | Leung | |
| 2002/0085703 | A1 | 7/2002 | Proctor | |
| 2002/0091843 | A1 | 7/2002 | Vaid | |
| 2002/0105911 | A1 | 8/2002 | Pruthi et al. | |
| 2002/0116522 | A1 * | 8/2002 | Zelig | 709/235 |
| 2002/0143971 | A1 | 10/2002 | Govindarajan et al. | |
| 2002/0152319 | A1 | 10/2002 | Amin et al. | |
| 2002/0172209 | A1 * | 11/2002 | Ohta et al. | 370/401 |
| 2002/0176404 | A1 | 11/2002 | Girard | |
| 2003/0002650 | A1 | 1/2003 | Gruchala | |
| 2003/0016653 | A1 | 1/2003 | Davis | |
| 2003/0016876 | A1 | 1/2003 | Chai et al. | |
| 2003/0086515 | A1 | 5/2003 | Trans et al. | |
| 2003/0120789 | A1 | 6/2003 | Hepworth et al. | |
| 2003/0227878 | A1 | 12/2003 | Krumm-Heller et al. | |
| 2004/0073641 | A1 | 4/2004 | Minhazuddin et al. | |
| 2004/0073690 | A1 | 4/2004 | Hepworth et al. | |
| 2005/0064899 | A1 | 3/2005 | Angelopoulos et al. | |
| 2005/0119892 | A1 | 6/2005 | Agapi et al. | |
| 2005/0119894 | A1 | 6/2005 | Cutler et al. | |
| 2005/0125229 | A1 | 6/2005 | Kurzweil | |
| 2005/0125230 | A1 | 6/2005 | Haas | |
| 2005/0131697 | A1 | 6/2005 | Brown et al. | |
| 2005/0131698 | A1 | 6/2005 | Tischer | |
| 2005/0131699 | A1 | 6/2005 | Fukada | |
| 2005/0131700 | A1 | 6/2005 | Washburn et al. | |
| 2005/0154590 | A1 | 7/2005 | Coffey et al. | |
| 2005/0177370 | A1 | 8/2005 | Hwang et al. | |

| | | |
|---|---|---|
| 2005/0180323 A1 | 8/2005 | Beightol et al. |
| 2005/0186933 A1 | 8/2005 | Trans |
| 2005/0192808 A1 | 9/2005 | Sugiyama |
| 2005/0203746 A1 | 9/2005 | Obata |
| 2005/0216268 A1 | 9/2005 | Kannappan |
| 2005/0228673 A1 | 10/2005 | Nefian et al. |
| 2005/0228674 A1 | 10/2005 | Gunn et al. |
| 2005/0228675 A1 | 10/2005 | Trinkel et al. |
| 2005/0240409 A1 | 10/2005 | Gallistel |
| 2005/0240410 A1 | 10/2005 | Charles et al. |
| 2005/0240412 A1 | 10/2005 | Fujita |
| 2005/0240413 A1 | 10/2005 | Asano et al. |
| 2005/0246173 A1 | 11/2005 | Creamer et al. |
| 2005/0246174 A1 | 11/2005 | DeGolia |
| 2005/0256717 A1 | 11/2005 | Miyata et al. |
| 2005/0261035 A1 | 11/2005 | Groskreutz et al. |
| 2005/0261907 A1 | 11/2005 | Smolenski et al. |
| 2005/0273339 A1 | 12/2005 | Chaudhari et al. |
| 2005/0278148 A1 | 12/2005 | Bader et al. |
| 2005/0278177 A1 | 12/2005 | Gottesman |
| 2005/0278178 A1 | 12/2005 | Girouard et al. |
| 2005/0283366 A1 | 12/2005 | Lee |
| 2005/0283367 A1 | 12/2005 | Ativanichayaphong et al. |
| 2005/0283368 A1 | 12/2005 | Leung |
| 2005/0288933 A1 | 12/2005 | Nakamura et al. |
| 2005/0288934 A1 | 12/2005 | Omi |
| 2005/0288935 A1 | 12/2005 | Lee et al. |
| 2006/0004579 A1 | 1/2006 | Claudatos et al. |
| 2006/0009979 A1 | 1/2006 | McHale et al. |
| 2006/0009980 A1 | 1/2006 | Burke et al. |
| 2006/0020468 A1 | 1/2006 | Hilliard |
| 2006/0020469 A1 | 1/2006 | Rast |
| 2006/0031073 A1 | 2/2006 | Anglin et al. |
| 2006/0036440 A1 | 2/2006 | Kunkel |
| 2006/0047515 A1 | 3/2006 | Connors |
| 2006/0067486 A1 | 3/2006 | Zellner et al. |
| 2006/0069568 A1 | 3/2006 | Passaretti et al. |
| 2006/0069570 A1 | 3/2006 | Allison et al. |
| 2006/0069779 A1 | 3/2006 | Sundqvist et al. |
| 2006/0074679 A1 | 4/2006 | Pifer et al. |
| 2006/0074681 A1 | 4/2006 | Janiszewski et al. |
| 2006/0074682 A1 | 4/2006 | Chou et al. |
| 2006/0080103 A1 | 4/2006 | Van Breemen |
| 2006/0080104 A1 | 4/2006 | Dang |
| 2006/0100879 A1 | 5/2006 | Jakobsen et al. |
| 2006/0100880 A1 | 5/2006 | Yamamoto et al. |
| 2006/0100881 A1 | 5/2006 | He |
| 2006/0100882 A1 | 5/2006 | Eves et al. |
| 2006/0100883 A1 | 5/2006 | Miyamoto et al. |
| 2006/0106610 A1 | 5/2006 | Napper |
| 2006/0106611 A1 | 5/2006 | Krasikov et al. |
| 2006/0106613 A1 | 5/2006 | Mills |
| 2006/0116880 A1 | 6/2006 | Gober |
| 2006/0116881 A1 | 6/2006 | Umezawa et al. |
| 2006/0129405 A1 | 6/2006 | Elfanbaum |
| 2006/0136217 A1 | 6/2006 | Mullin |
| 2006/0143014 A1 | 6/2006 | Cheng et al. |
| 2006/0143015 A1 | 6/2006 | Knott et al. |
| 2006/0161440 A1 | 7/2006 | Nakayama et al. |
| 2006/0167694 A1 | 7/2006 | Mitsuyoshi |
| 2006/0167695 A1 | 7/2006 | Spille et al. |
| 2006/0173688 A1 | 8/2006 | Whitham |
| 2006/0190262 A1 | 8/2006 | Roskind |
| 2006/0195322 A1 | 8/2006 | Broussard et al. |
| 2006/0217985 A1 | 9/2006 | Noguchi et al. |
| 2006/0235693 A1 | 10/2006 | Ruderman et al. |
| 2006/0247931 A1 | 11/2006 | Caskey et al. |
| 2006/0247932 A1 | 11/2006 | Yamamoto |
| 2007/0103317 A1 | 5/2007 | Zellner et al. |
| 2007/0133403 A1 | 6/2007 | Hepworth et al. |
| 2007/0168195 A1 | 7/2007 | Wilkin et al. |
| 2007/0172083 A1 | 7/2007 | Tseng et al. |
| 2008/0117869 A1 | 5/2008 | Freen et al. |
| 2008/0151886 A1 | 6/2008 | Gentle et al. |
| 2008/0151898 A1 | 6/2008 | Gentle et al. |
| 2008/0151921 A1 | 6/2008 | Gentle et al. |
| 2010/0080374 A1 | 4/2010 | Hepworth et al. |

FOREIGN PATENT DOCUMENTS

| | | |
|---|---|---|
| EP | 1549035 | 6/2005 |
| WO | WO 91/14278 | 9/1991 |
| WO | WO 98/46035 | 10/1998 |
| WO | WO 99/51038 | 10/1999 |
| WO | WO 00/41090 | 7/2000 |
| WO | WO 00/72563 | 11/2000 |
| WO | WO 01/26393 | 4/2001 |
| WO | WO 01/75705 | 10/2001 |
| WO | WO 02/00316 | 1/2002 |

OTHER PUBLICATIONS

Notice of Allowability for U.S. Appl. No. 12/027,816, mailed Sep. 16, 2010.

Notice of Allowability for U.S. Appl. No. 12/027,811, mailed Sep. 16, 2010.

Official Action for U.S. Appl. No. 12/027,790, mailed Sep. 14, 2010.

U.S. Appl. No. 10/882,975, filed Jun. 30, 2004, Becker et al.

U.S. Appl. No. 12/133,533, filed Jun. 5, 2008, Kloberdans et al.

"Access for 9-1-1 and Telephone Emergency Services," American with Disabilities Act, U.S. Department of Justice (Jul. 15, 1998), available at http://www.usdoj.gov/crt/ada/911ta.htm, 11 pages.

"Comments of the National Association of State Utility Consumer Advocates," filed with the Federal Communications Commission, Washington, D.C. (May 28, 2004), pp. 1-74.

"NANPA ANI II Digits," NeuStar, Inc. (2003), available at http://www.nanpa.com/number_resource_info/ani_ii_assignments.html, 5 pages.

"Packet Loss and Packet Loss Concealment Technical Brief," Nortel Networks at http://www.nortelnetworks.com (2000).

"Telogy Networks' Voice Over Packet White Paper," Telogy Networks, Inc., available at http://www.telogy.com/our_products/golden_gateway/VOPwhite.html (Jan. 1998).

"Voice over packet: An assessment of voice performance on packet networks white paper," Nortel Networks, Publication No. 74007.25/09-01, at http://www.nortelnetworks.com (2001).

Application Note, Emergency 911 In Packet Networks, http:www.fastcomm.com/NewWeb/solutions/e911.html, Sep. 5, 2001, FastComm Communications Corporation,3 pgs.

Baker (Editor), "Requirements for IP Version 4 Routers", RFC 1812, Jun. 1995, 175 pages.

Benjamin et al. "A Survey of Error-Concealment Schemes for Real-Time Audio and Video Transmissions over the Internet" Department of Electrical and Computer Engineering and the Coordinate Science Laboratory, University of Illinois at Urbana-Champaign, Proc. IEEE Int'l Symposium on Multimedia Software Engineering, Dec. 2000.

Bernet et al., "Specification of the Null Service Type", RFC 2997, Nov. 2000, 12 pages.

Bernet, "Format of the RSVP DCLASS Object", RFC 2996, Nov. 2000, 9 pages.

Berney et al., "A Framework for Integrated Services Operation over Diffserv Networks", RFC 2998, Nov. 2000, 29 pages.

Braden et al. "Resource ReSerVation Protocol (RSVP)", RFC 2205, Sep. 1997, 6 pages.

Brown, I. Internet Engineering Task Force, Securing Prioritised Emergency Traffic, http://www.iepscheme.net/docs/draft-brown-ieps-sec-00.txt, Jul. 5, 2001, pp. 1-12.

Carlberg, Ken. Internet Engineering Task Force, Framework for Supporting IEPS in IP Telephony, http://www.iepscheme.net/docs/draft-carlberg-ieps-framework-01.tex, Jul. 4, 2001, pp. 1-24.

Chan et al., "COPS Usage for Policy Provisioning (COPS-PR)", RFC 3084, Mar. 2001, 32 pages.

Cisco IP Phone 7960, eLearning Tutorial, at www.cisco.com/warp/public/779/largeent/avvid/products/7960/7960_show_using_help.htm.

Cisco Systems, "Cisco Emergency Responder Version 1.1 Data Sheet" (Oct. 2001), 5 pages, copyright 1992-2001.

Ejaz Mahfuz; "Packet Loss Concealment for Voice Transmission Over IP Networks" (2001) (Master thesis, Department of Electrical Engineering, McGill University) (on file with author).

Floyd et al., "Random Early Detection Gateways for Congestion Avoidance", IEEE/ACM Transaction on Networking, Aug. 1993, 22 pages.
Geeta Desai Chennubhotla, "Embedded Systems: Rough start, but voice market growing," EE Times, at http://www.eetimes.com/in_focus/embedded_systems/EOG20020503S0067 (May 6, 2002).
Getting Started with the Cisco IP Phone 7960/7940, pp. 1-1 to 1-4, date unknown.
Government Emergency Telecommunications Service (GETS), "White Paper on IP Teleponhy A Roadmap to Supporting GETS in IP Networks," Apr. 27, 2000, Science Applications International Corporation, pp. 1-32.
Grigonis, Computer Telephony Encyclopedia, pp. 268-277 (2000).
Handley et al., "SIP: Session Initiation Protocol", RFC 2543, Mar. 1999, 81 pages.
Herzog et al., "COPS Usage for RSVP", RFC 2749, Jan. 2000, 16 pages.
Huai-Rong Shao et al., "A New Framework for Adaptive Multimedia over the Next Generation Internet," Microsoft Research China, date unknown 4 pages.
IEEE Standards for Information Technology—Telecommunications and information exchange between systems—Local and metropolitan area networks—Common specifications—Part 3: Media Access Control (MAC) Bridges, LAN/MAN Standards Committee of the IEEE Computer Society, ANSI/IEEE Std 802.1D, 1998.
IEEE Standards for Local and Metropolitan Area Networks: Virtual Bridged Local Area Networks, The Institute of Electrical and Electronics Engineers, IEEE Std 802.1Q-1998 (Mar. 8, 1999).
International Emergency Preference Scheme (IEPS), http://www.iepscheme.net/, Jun. 16, 2000, pp. 1-2.
International Engineering Consortium, "Silence Suppression and Comfort Noise Generation" at http://www.iec.org/online/tutorials/voice_qual/topic07.html (Jul. 1, 2002).
International Telecommunication Union; "General Aspects of Digital Transmission Systems: Coding of Speech at 8kbit/s Using Conjugate-Structure Algebraic-Code-Excited Linear-Prediction" (CS-ACELP) ITU-T Recommendation G.729 (Mar. 1996).
ITU, "Packet-based multimedia communications systems", H. 323, Feb. 1998, 125 pages.
J. Heinanen et al., "Assured Forwarding PHB Group," Network Working Group, Category: Standards Track (Jun. 1999).
K. Nichols, Cisco Systems, RFC 2474, Definition of Differentiated Services Field in IPv4 & IPv6 Headers, Dec. 1998.
Kathy Lynn Hewitt, Desktop Video Conferencing: A Low Cost and Scalable Solution to Distance Education, "Chapter 2—Internet Conferencing Protocols" thesis submitted to North Carolina State University (1997), at http://www2.ncsu.edu/eos/service/ece/project/succeed_info/klhewitt/thesis/toc.html.
Le Boudec, Jean-Yves et al., slideshow entitled "Quality of Service in IP Networks (2)," Queue Management (undated), pp. 1-30.
McCloghrie et al., "Structure of Policy Provisioning Information (SPPI)", RFC 3159, Aug. 2001, 38 pages.
PacketCable, Cable Labs, http://www.packetcable.com, copyright 2000-2002.
PacketCableTM Dynamic Quality-of-Service Specification PKT-SP-DQOS-102-000818, 2000, Cable Television Laboratories, Inc., 211 pages.
Paul Roller Michaelis, "Speech Digitization and Compression", Int'l Encyclopedia of Ergonomic and Human Factors (W. Warkowski ed., Taylor & Francis 2001).
Peter Parnes, "Real-time Transfer Protocol (RTP)" (Sep. 8, 1997), at www.cdt.luth.se/~peppar/docs/lic/html/node166.html.
RADVision, "SIP: Protocol Overview," (2001), pp. 1-16.
S. Blake et al., "An Architecture for Differentiated Services," Network Working Group, Category: Informational (Dec. 1998).

Sangeun Han et al., "Transmitting Scalable Video over a DiffServ network," EE368C Project Proposal (Jan. 30, 2001).
Schulzrinne, "Emergency Call Services for SIP-based Internet Telephony," Internet Engineering Task Force (Mar. 25, 2001), pp. 1-17.
Schulzrinne. Providing Emergency Call Services for SIP-based Internet Telephony, http//www.softarmor.com/sipping/drafts/draft-schulzrinne-sip-911-00.txt., Jul. 13, 2000, pp. 1-13.
TechTarget, "Voice activation detection," at http://searchnetworking.te...m/sDefinition/0,,sid7_gci342466.00.html (Jul. 1, 2002).
V. Jacobson et al., "An Expedited Forwarding PHB," Network Working Group, Category: Standards Track (Jun. 1999).
Wroclawski, "The use of RSVP with IETF Integrated Services", RFC 2210, Sep. 1997, 31 pages.
3COM, 3Com IP Conferencing and Presence Modules, Dec. 2006, pp. 1-2, http://www.3com.com/other/pdfs/products/en_US/3com_400867.pdf.
Chelston Call Systems, How Audio Conferencing Can Benefit Your Organisation, Jan. 2, 2008, pp. 1-3, http://www.chelston.co.uk/Welcome/Pages/Products/Audio-Conferencing.htm.
Ditech Networks, Conferencing Voice Quality and Echo Cancellation, (undated) (printed Jan. 2, 2008), pp. 1-4, http:/www.ditechcom.com/solutions/solutionsdetail.aspx?pid=44.
Global IP Solutions, Backgrounder, (undated) (printed Jan. 2, 2008), pp. 2-6, http://www.gipscorp.com/default/backgrounder.html.
Indosoft Inc., Teleconferencing Bridge Features, 2005, pp. 1-6, http:/www.indosoft.ca/features.htm.
Iwatsu Voice Networks, News: Iwatsu Announces the Release of the IX-CNFBOX-1 Eight-Party Conference Bridge for ADIX, Feb. 26, 1998, pp. 1, http://ivoicenetworks.com/News/pr-cfnb.html.
NEC America, Conference Bridge Solution for the Electrak Elite IPK/IPK II, Jan. 2006, pp. 1-2, available at http://www.necunifiedsolutions.com/Downloads/PDFs/790304_EE_IPK_II_ConfBridge.pdf.
NEC Infrontia Inc., Aspire Conference Bridge data Sheet, 2007, pp. 1-2, http://www.necaspire.com/necaspire/conference_bridge/conference_bridge.php.
Newly-released feature and enhancement highlights of "Avaya MultiVantage Software"; Release 1.2, Jan. 2003; 9 pages.
Polycom Inc., Polycom VoicePlus, Full featured PSTN and VoIP conferencing, 2003, pp. 1-2, available at http://www.ccpin.com/pdf/Polycom/VoicePlus.pdf.
Skype Journal, High Definition Voice: Bringing Skype's high Bandwidth Audio to Conference Calls, Oct. 23, 2007, pp. 1-5, http://skypejournal.com/blog/2007/10/high_definition_voice_bringing.html.
Squelch from Wikipedia; printed from Internet at: http://en.wikipedia.org/w/index.php?title=Squelch&printable=yes; 4 pages.
Thomasnet, ShoreTel Extends Portfolio of Collaboration Solutions with SIP-Enabled ShoreTel IP 8000 Conference Phone, Jul. 17, 2007, pp. 1-2, http://news.thomasnet.com/printready.html?prid=525606.
TMCNET, Aastra selects Octasic OCT6100 device for CNX Conference Bridge Appliance, Mar. 8, 2005, pp. 1-2, http://www.tmcnet.com/usubmit/2005/Mar/1123217.htm.
"Using the 79xx Status Information For Troubleshooting" available at http://www.cisco.com/en/US/products/hw/phones/ps379/products_tech_note09186a00800945bd.shtml#display, Updated: Nov. 13, 2006, pp. 1-5.
Background of the Invention for the above-captioned application (previously provided).
Restriction Requirement for U.S. Appl. No. 12/027,790, mailed Dec. 29, 2009.
Official Action for U.S. Appl. No. 12/027,790, mailed Apr. 1, 2010.
Official Action for U.S. Appl. No. 12/027,811, mailed Apr. 1, 2010.
Official Action for U.S. Appl. No. 11/672,183, mailed Mar. 23, 2010.
Official Action for U.S. Appl. No. 12/027,816, mailed Apr. 1, 2010.

* cited by examiner

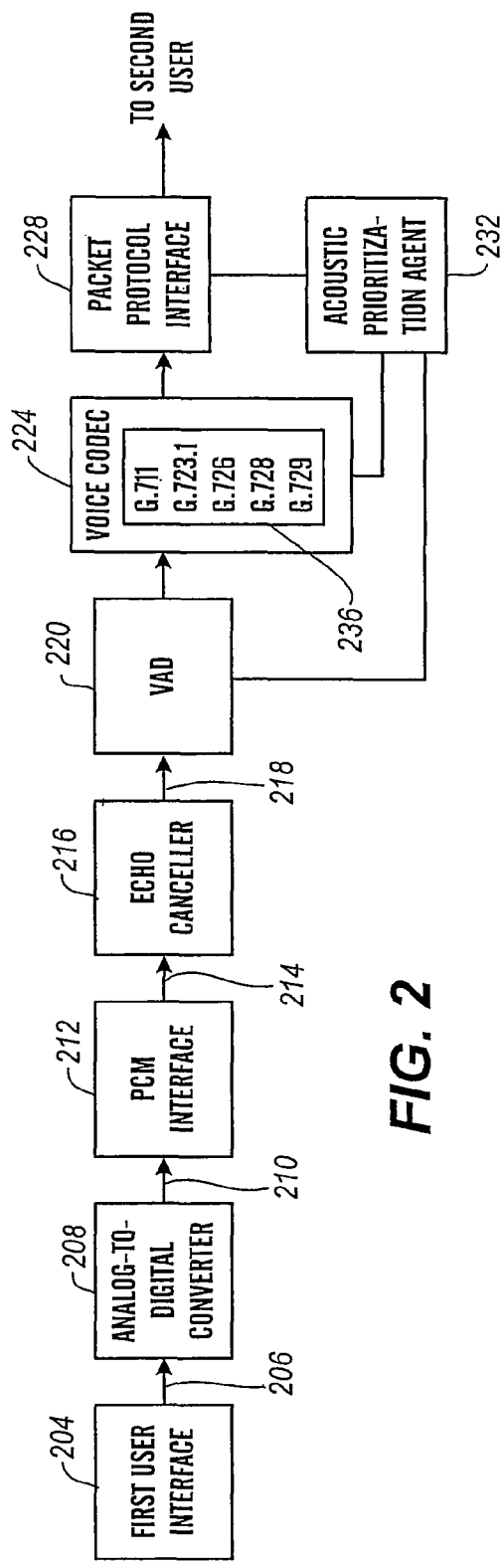
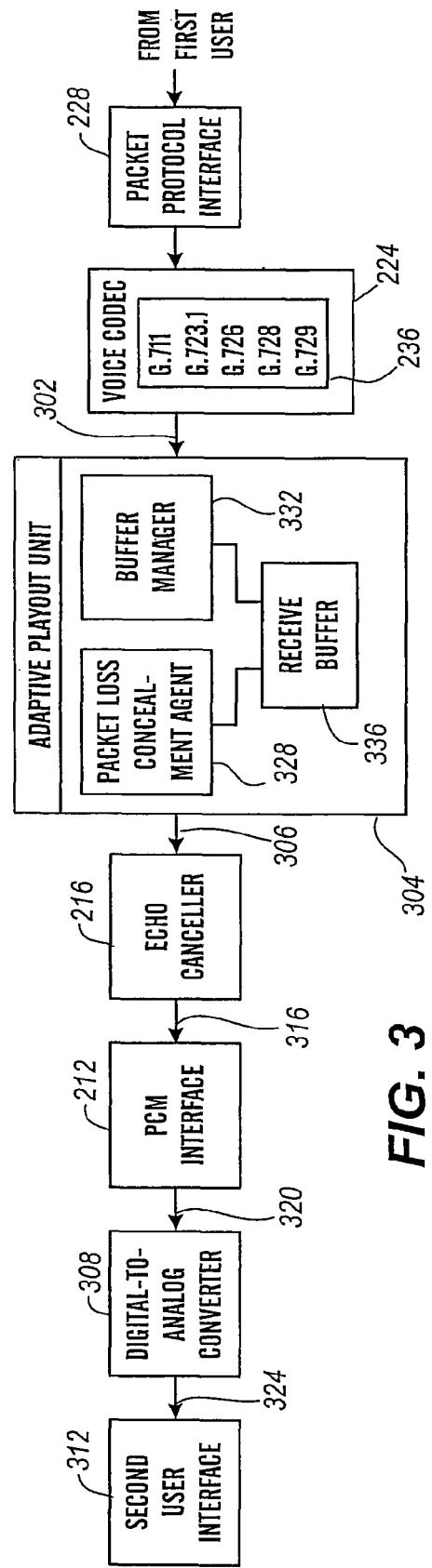
FIG. 2
FIG. 3

PACKET PRIORITIZATION AND ASSOCIATED BANDWIDTH AND BUFFER MANAGEMENT TECHNIQUES FOR AUDIO OVER IP

CROSS-REFERENCE TO RELATED APPLICATIONS

This application is a divisional of U.S. patent application Ser. No. 12/027,790, filed on Feb. 7, 2008, which is a divisional of U.S. patent application Ser. No. 10/262,621 filed on Sep. 30, 2002 and both entitled "PACKET PRIORITIZATION AND ASSOCIATED BANDWIDTH AND BUFFER MANAGEMENT TECHNIQUES FOR AUDIO OVER IP", the entire disclosure of each of which is herein incorporated by reference in its entirety.

FIELD OF THE INVENTION

The present invention relates generally to audio communications over distributed processing networks and specifically to voice communications over data networks.

BACKGROUND OF THE INVENTION

Convergence of the telephone network and the Internet is driving the move to packet-based transmission for telecommunication networks. As will be appreciated, a "packet" is a group of consecutive bytes (e.g., a datagram in TCP/IP) sent from one computer to another over a network. In Internet Protocol or IP telephony or Voice Over IP (VoIP), a telephone call is sent via a series of data packets on a fully digital communication channel. This is effected by digitizing the voice stream, encoding the digitized stream with a codec, and dividing the digitized stream into a series of packets (typically in 20 millisecond increments). Each packet includes a header, trailer, and data payload of one to several frames of encoded speech. Integration of voice and data onto a single network offers significantly improved bandwidth efficiency for both private and public network operators.

In voice communications, high end-to-end voice quality in packet transmission depends principally on the speech codec used, the end-to-end delay across the network and variation in the delay (jitter), and packet loss across the channel. To prevent excessive voice quality degradation from transcoding, it is necessary to control whether and where transcodings occur and what combinations of codecs are used. End-to-end delays on the order of milliseconds can have a dramatic impact on voice quality. When end-to-end delay exceeds about 150 to 200 milliseconds one way, voice quality is noticeably impaired. Voice packets can take an endless number of routes to a given destination and can arrive at different times, with some arriving too late for use by the receiver. Some packets can be discarded by computational components such as routers in the network due to network congestion. When an audio packet is lost, one or more frames are lost too, with a concomitant loss in voice quality.

Conventional VoIP architectures have developed techniques to resolve network congestion and relieve the above issues. In one technique, voice activity detection (VAD) or silence suppression is employed to detect the absence of audio (or detect the presence of audio) and conserve bandwidth by preventing the transmission of "silent" packets over the network. Most conversations include about 50% silence. When only silence is detected for a specified amount of time, VAD informs the Packet Voice Protocol and prevents the encoder output from being transported across the network. VAD is, however, unreliable and the sensitivity of many VAD algorithms imperfect. To exacerbate these problems, VAD has only a binary output (namely silence or no silence) and in borderline cases must decide whether to drop or send the packet. When the "silence" threshold is set too low, VAD is rendered meaningless and when too high audio information can be erroneously classified as "silence" and lost to the listener. The loss of audio information can cause the audio to be choppy or clipped. In another technique, a receive buffer is maintained at the receiving node to provide additional time for late and out-of-order packets to arrive. Typically, the buffer has a capacity of around 150 milliseconds. Most but not all packets will arrive before the time slot for the packet to be played is reached. The receive buffer can be filled to capacity at which point packets may be dropped. In extreme cases, substantial, consecutive parts of the audio stream are lost due to the limited capacity of the receive buffer leading to severe reductions in voice quality. Although packet loss concealment algorithms at the receiver can reconstruct missing packets, packet reconstruction is based on the contents of one or more temporally adjacent packets which can be acoustically dissimilar to the missing packet(s), particularly when several consecutive packets are lost, and therefore the reconstructed packet(s) can have very little relation to the contents of the missing packet(s).

SUMMARY OF THE INVENTION

These and other needs are addressed by the various embodiments and configurations of the present invention. The present invention is directed generally to a computational architecture for efficient management of transmission bandwidth and/or receive buffer latency.

In one embodiment of the present invention, a transmitter for a voice stream is provided that comprises:

(a) a packet protocol interface operable to convert one or more selected segments (e.g., frames) of the voice stream into a packet and (b) an acoustic prioritization agent operable to control processing of the selected segment and/or packet based on one or more of (i) a level of confidence that the contents of the selected segment are not the product of voice activity (e.g., are silence), (ii) a type of voice activity (e.g., plosive) associated with or contained in the contents of the selected segment, and (iii) a degree of acoustic similarity between the selected segment and another segment of the voice stream.

The level of confidence permits the voice activity detector to provide a ternary output as opposed to the conventional binary output. The prioritization agent can use the level of confidence in the ternary output, possibly coupled with one or measures of the traffic patterns on the network, to determine dynamically whether or not to send the "silent" packet and, if so, use a lower transmission priority or class for the packet.

The type of voice activity permits the prioritization agent to identify extremely important parts of the voice stream and assign a higher transmission priorities and/or class to the packet(s) containing these parts of the voice stream. The use of a higher transmission priority and/or class can significantly reduce the likelihood that the packet(s) will arrive late, out of order, or not at all.

The comparison of temporally adjacent packets to yield a degree of acoustic similarity permits the prioritization agent to control bandwidth effectively. The agent can use the degree of similarity, possibly coupled with one or measures of the traffic patterns on the network, to determine dynamically whether or not to send a "similar" packet and, if so, use a lower transmission priority or class for the packet. Packet loss concealment algorithms at the receiver can be used to reconstruct the omitted packet(s) to form a voiced signal that closely matches the original signal waveform. Compared to conventional transmission devices, fewer packets can be sent over the network to realize an acceptable signal waveform.

In another embodiment of the present invention, a receiver for a voice stream is provided that comprises:

(a) a receive buffer containing a plurality of packets associated with voice communications; and (b) a buffer manager operable to remove some of the packets from the receive buffer while leaving other packets in the receive buffer based on a level of importance associated with the packets.

In one configuration, the level of importance of the each of the packets is indicated by a corresponding value marker. The level of importance or value marker can be based on any suitable criteria, including a level of confidence that contents of the packet contain voice activity, a degree of similarity of temporally adjacent packets, the significance of the audio in the packet to receiver understanding or fidelity, and combinations thereof.

In another configuration, the buffer manager performs time compression around the removed packet(s) to prevent reconstruction of the packets by the packet loss concealment algorithm. This can be performed by, for example, resetting a packet counter indicating an ordering of the packets, such as by assigning the packet counter of the removed packet to a packet remaining in the receive buffer.

In another configuration, the buffer manager only removes packet(s) from the buffer when the buffer delay or capacity equals or exceeds a predetermined level. When the buffer is not in an overcapacity situation, it is undesirable to degrade the quality of voice communications, even if only slightly.

The various embodiments of the present invention can provide a number of advantages. First, the present invention can decrease substantially network congestion by dropping unnecessary packets, thereby providing lower end-to-end delays across the network, lower degrees of variation in the delay (jitter), and lower levels of packet loss across the channel. Second, the various embodiments of the present invention can handle effectively the bursty traffic and best-effort delivery problems commonly encountered in conventional networks while maintaining consistently and reliably high levels of voice quality reliably. Third, voice quality can be improved relative to conventional voice activity detectors by not discarding "silent" packets in borderline cases.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 2 is a block diagram of the functional components of a transmitting voice communication device according to the first embodiment;

FIG. 3 is a block diagram of the functional components of a receiving voice communication device according to the first embodiment;

DETAILED DESCRIPTION

Figure 1:
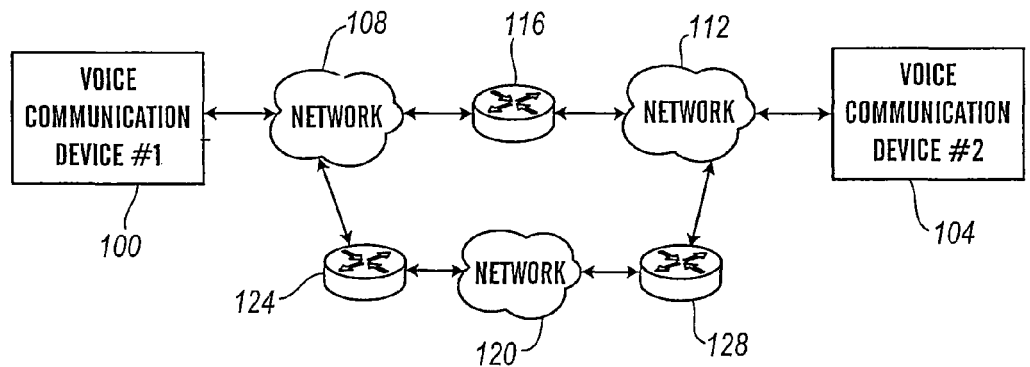
FIG. 1 is a block diagram of a simple network for a VoIP session between two endpoints according to a first embodiment of the present invention.

FIG. 1 is a simplistic VoIP network architecture according to a first embodiment of the present invention. First and second voice communication devices 100 and 104 transmit and receive VoIP packets. The packets can be transmitted over one of two paths. The first and shortest path is via networks 108 and 112 and router 116. The second and longer path is via networks 108, 112, and 120 and routers 124 and 128. Depending upon the path followed, the packets can arrive at either of the communication devices at different times. As will be appreciated, network architectures suitable for the present invention can include any number of networks and routers and other intermediate nodes, such as transcoding gateways, servers, switches, base transceiver stations, base station controllers, modems, router, and multiplexers and employ any suitable packet-switching protocols, whether using connection oriented or connectionless services, including without limitation Internet Protocol or IP, Ethernet, and Asynchronous Transfer Mode or ATM.

As will be further appreciated, the first and second voice communication devices 100 and 104 can be any communication devices configured to transmit and/or receive packets over a data network, such as the Internet. For example, the voice communication devices 100 and 104 can be a personal computer, a laptop computer, a wired analog or digital telephone, a wireless analog or digital telephone, intercom, and radio or video broadcast studio equipment.

FIG. 2 depicts an embodiment of a transmitting voice communication device. The device 200 includes, from left to right, a first user interface 204 for outputting signals inputted by the first user (not shown) and an outgoing voice stream 206 received from the first user, an analog-to-digital converter 208, a Pulse Code Modulation or PMC interface 212, an echo canceller 216, a Voice Activity Detector or VAD 10, a voice codec 14, a packet protocol interface 18 and an acoustic prioritizing agent 232.

The first user interface 204 is conventional and be configured in many different forms depending upon the particular implementation. For example, the user interface 204 can be configured as an analog telephone or as a PC.

The analog-to-digital converter 208 converts, by known techniques, the analog outgoing voice stream 206 received from the first user interface 204 into an outgoing digital voice stream 210.

The PCM interface 212, inter alia, forwards the outgoing digital voice stream 210 to appropriate downstream processing modules for processing.

The echo canceller 216 performs echo cancellation on the digital stream 214, which is commonly a sampled, full-duplex voice port signal. Echo cancellation is preferably G.165 compliant.

The VAD 10 monitors packet structures in the incoming digital voice stream 216 received from the echo canceller 216 for voice activity. When no voice activity is detected for a configurable period of time, the VAD 10 informs the acoustic prioritizing agent 232 of the corresponding packet structure(s) in which no voice activity was detected and provides a level of confidence that the corresponding packet structure(s) contains no meaningful voice activity. This output is typically provided on a packet structure-by-packet structure basis. These operations of the VAD are discussed below with reference to FIG. 4.

VAD 10 can also measure the idle noise characteristics of the first user interface 204 and report this information to the packet protocol interface 18 in order to relay this information to the other voice communication device for comfort noise generation (discussed below) when no voice activity is detected.

The voice codec 14 encodes the voice data in the packet structures for transmission over the data network and compares the acoustic information (each frame of which includes spectral information such as sound or audio amplitude as a function of frequency) in temporally adjacent packet structures and assigns to each packet an indicator of the difference between the acoustic information in adjacent packet structures. These operations are discussed below with reference to FIG. 5. As shown in box 22, the voice codec typically include, in memory, numerous voice codecs capable of different compression ratios. Although only codecs G.711, G.723.1, G.726, G.728, and G.78 are shown, it is to be understood that any voice codec whether known currently or developed in the future could be in memory. Voice codecs encode and/or compress the voice data in the packet structures. For example, a compression of 8:1 is achievable with the G.78 voice codec (thus the normal 64 Kbps PCM signal is transmitted in only 8 Kbps). The encoding functions of codecs are further described in Michaelis, *Speech Digitization and Compression, in the International Encyclopedia of Ergonomics and Human Factors*, edited by Warkowski, 2001; ITU-T Recommendation G.78 *General Aspects of Digital Transmission Systems, Coding of Speech at 8 kbit/s using Conjugate-Structure Algebraic-Code-Excited Linear-Prediction*, March 1996; and Mahfuz, *Packet Loss Concealment for Voice Transmission Over IP Networks*, September 2001, each of which is incorporated herein by this reference.

The prioritization agent 232 efficiently manages the transmission bandwidth and the receive buffer latency. The prioritization agent (a) determines for each packet structure, based on the corresponding difference in acoustic information between the selected packet structure and a temporally adjacent packet structure (received from the codec), a relative importance of the acoustic information contained in the selected packet structure to maintaining an acceptable level of voice quality and/or (b) determines for each packet structure containing acoustic information classified by the VAD 10 as being "silent" a relative importance based on the level of confidence (output by the VAD for that packet structure) that the acoustic information corresponds to no voice activity. The acoustic prioritization agent, based on the differing levels of importance, causes the communication device to process differently the packets corresponding to the packet structures. The packet processing is discussed in detail below with reference to FIG. 6.

The packet protocol interface 18 assembles into packets and sequences the outgoing encoded voice stream and configures the packet headers for the various protocols and/or layers required for transmission to the second voice communication device 300 (FIG. 3). Typically, voice packetization protocols use a sequence number field in the transmit packet stream to maintain temporal integrity of voice during playout. Under this approach, the transmitter inserts a packet counter, such as the contents of a free-running, modulo-16 packet counter, into each transmitted packet, allowing the receiver to detect lost packets and properly reproduce silence intervals during playout at the receiving communication device. In one configuration, the importance assigned by the acoustic prioritizing agent can be used to configure the fields in the header to provide higher or lower transmission priorities. This option is discussed in detail below in connection with FIG. 6.

The packetization parameters, namely the packet size and the beginning and ending points of the packet are communicated by the packet protocol interface 18 to the VAD 10 and codec 14 via the acoustic prioritization agent 232. The packet structure represents the portion of the voice stream that will be included within a corresponding packet's payload. In other words, a one-to-one correspondence exists between each packet structure and each packet. As will be appreciated, it is important that packetization parameter synchronization be maintained between these components to maintain the integrity of the output of the acoustic prioritization agent.

FIG. 3 depicts an embodiment of a receiving (or second) voice communication device 300. The device 300 includes, from right to left, the packet protocol interface 18 to remove the header information from the packet payload, the voice codec 14 for decoding and/or decompressing the received packet payloads to form an incoming digital voice stream 302, an adaptive playout unit 304 to process the received packet payloads, the echo canceller 216 for performing echo cancellation on the incoming digital voice stream 306, the PCM interface 212 for performing continuous phase resampling of the incoming digital voice stream 316 to avoid sample slips and forwarding the echo cancelled incoming voice stream 316 to a digital-to-analog converter 308 that converts the echo cancelled incoming voice stream 320 into an analog voice stream 324, and second user interface 312 for outputting to the second user the analog voice stream 324.

The adaptive playout unit 304 includes a packet loss concealment agent 328, a receive buffer 32, and a receive buffer manager 332. The adaptive playout unit 304 can further include a continuous-phase resampler (not shown) that removes timing frequency offset without causing packet slips or loss of data for voice or voiceband modem signals and a timing jitter measurement module (not shown) that allows adaptive control of FIFO delay.

The packet loss concealment agent 328 reconstructs missing packets based on the contents of temporally adjacent received packets. As will be appreciated, the packet loss concealment agent can perform packet reconstruction in a multiplicity of ways, such as replaying the last packet in place of the lost packet and generating synthetic speech using a circular history buffer to cover the missing packet. Preferred packet loss concealment algorithms preserve the spectral characteristics of the speaker's voice and maintain a smooth transition between the estimated signal and the surrounding original. In one configuration, packet loss concealment is performed by the codec.

The receive buffer 32 alleviates the effects of late packet arrival by buffering received voice packets. In most applications the receive buffer 32 is a First-In-First-Out or FIFO buffer that stores voice codewords before playout and removes timing jitter from the incoming packet sequence. As will be appreciated, the buffer 32 can dynamically increase and decrease in size as required to deal with late packets when the network is uncongested while avoiding unnecessary delays when network traffic is congested.

The buffer manager 332 efficiently manages the increase in latency (or end-to-end delay) introduced by the receive buffer 32 by dropping (low importance) enqueued packets as set forth in detail below in connection with FIGS. 7 and 8.

In addition to packet payload decryption and/or decompression, the voice codec 18 can also include a comfort noise generator (not shown) that, during periods of transmit silence when no packets are sent, generates a local noise signal that is presented to the listener. The generated noise attempts to match the true background noise. Without comfort noise, the listener can conclude that the line has gone dead.

Analog-to-digital and digital-to-analog converters 208 and 308, the pulse code modulation interface 212, the echo canceller 216a and b, packet loss concealment agent 328, and receive buffer 32 are conventional.

Although FIGS. 2 and 3 depict voice communication devices in simplex configurations, it is to be understood that each of the voice communication devices 200 and 300 can act both as a transmitter and receiver in a duplexed configuration.

Figure 4:
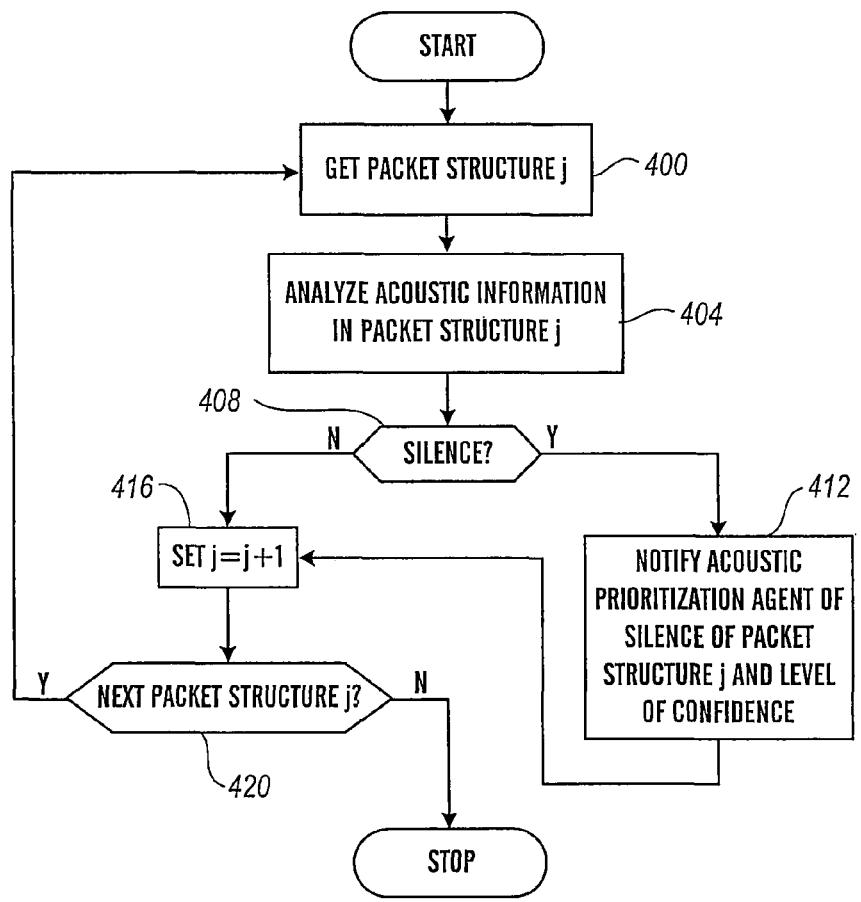
FIG. 4 is a flow chart of a voice activity detector according to a second embodiment of the present invention.

The operation of the VAD 10 will now be described with reference to FIGS. 2 and 4.

In the first step 60, the VAD 10 gets packet structure$_j$ from the echo canceled digital voice stream 218. Packet structure counter i is initially set to one. In step 64, the VAD 10 analyzes the acoustic information in packet structure$_j$ to identify by known techniques whether or not the acoustic information qualifies as "silence" or "no silence" and determine a level of confidence that the acoustic information does not contain meaningful or valuable acoustic information. The level of confidence can be determined by known statistical techniques, such as energy level measurement, least mean square adaptive filter (Widrow and Hoff 1959), and other Stochastic Gradient Algorithms. In one configuration, the acoustic threshold(s) used to categorize frames or packets as "silence" versus "nonsilence" vary dynamically, depending upon the traffic congestion of the network. The congestion of the network can be quantified by known techniques, such as by jitter determined by the timing measurement module (not shown) in the adaptive playout unit of the sending or receiving communication device, which would be forwarded to the VAD 10. Other selected parameters include latency or end-to-end delay, number of lost or dropped packets, number of packets received out-of-order, processing delay, propagation delay, and receive buffer delay/length. When the selected parameter(s) reach or fall below selected levels, the threshold can be reset to predetermined levels.

In step 68, the VAD 10 next determines whether or not packet structure$_j$ is categorized as "silent" or "nonsilent". When packet structure$_j$ is categorized as being "silent", the VAD 10, in step 412, notifies the acoustic prioritization agent 232 of the packet structure$_j$ beginning and/or endpoint(s), packet length, the "silent" categorization of packet structure$_j$, and the level of confidence associated with the "silent" categorization of packet structure$_j$. When packet structure$_j$ is categorized as "nonsilent" or after step 412, the VAD 10 in step 416 sets counter j equal to j+1 and in step 420 determines whether there is a next packet structure$_j$. If so, VAD 10 returns to and repeats step 60. If not, VAD 10 terminates operation until a new series of packet structures is received.

Figure 5:
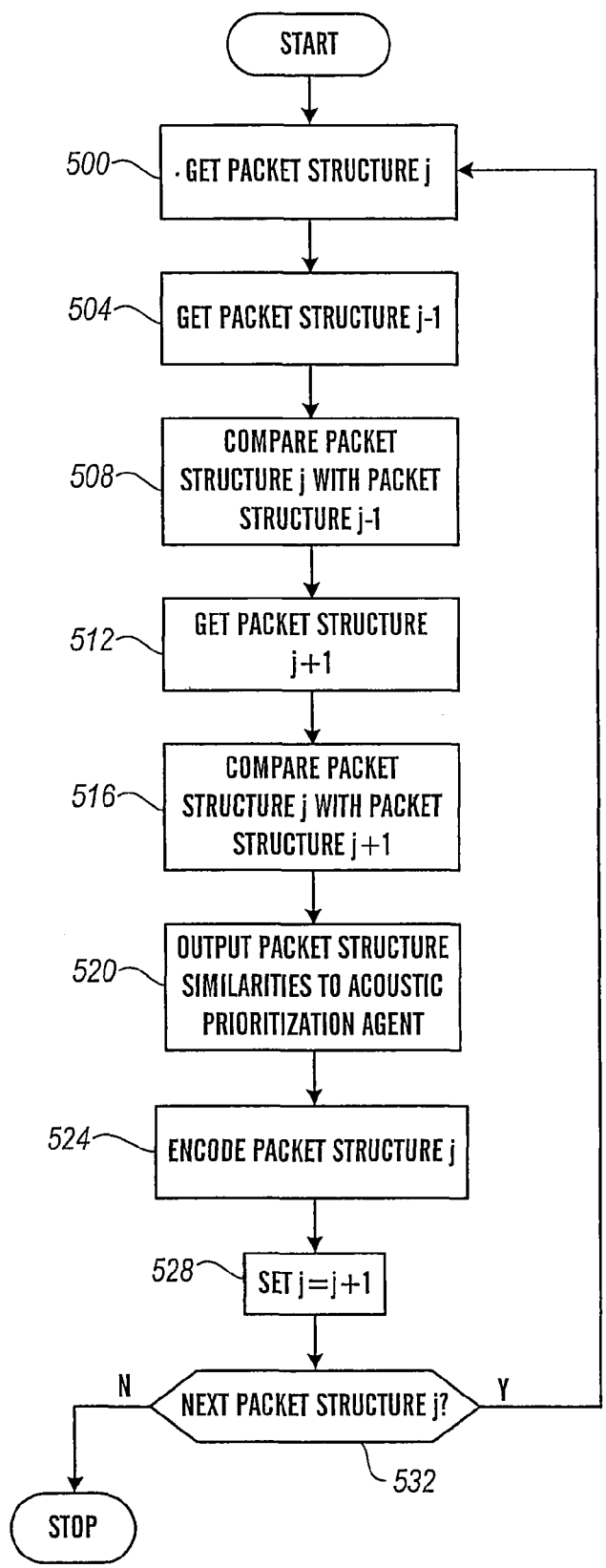
FIG. 5 is a flow chart of a codec according to a third embodiment of the present invention.

The operation of the codec 14 will now be described with reference to FIGS. 2 and 5. In steps 500, 504 and 512, respectively, the codec 14 gets packet structure$_j$, packet structure$_{j-1}$, and packet structure$_{j+1}$. Packet structure counter j is, of course, initially set to one.

In steps 508 and 516, respectively, the codec 14 compares packet structure$_j$ with packet structure$_{j-1}$, and packet structure$_j$ with packet structure$_{j+1}$. As will be appreciated, the comparison can be done by any suitable technique, either currently or in the future known by those skilled in the art. For example, the amplitude and/or frequency waveforms (spectral information) formed by the collective frames in each packet can be mathematically compared and the difference(s) quantified by one or more selected measures or simply by a binary output such as "similar" or "dissimilar". Acoustic comparison techniques are discussed in Michaelis, et al., *A Human Factors Engineer's Introduction to Speech Synthesizers, in Directions in Human-Computer Interaction*, edited by Badre, et al., 1982, which is incorporated herein by this reference. If a binary output is employed, the threshold selected for the distinction between "similar" and "dissimilar" can vary dynamically based on one or more selected measures or parameters of network congestion. Suitable measures or parameters include those set forth previously. When the measures increase or decrease to selected levels the threshold is varied in a predetermined fashion.

In step 520, the codec 14 outputs the packet structure similarities/nonsimilarities determined in steps 508 and 516 to the acoustic prioritization agent 232. Although not required, the codec 14 can further provide a level of confidence regarding the binary output. The level of confidence can be determined by any suitable statistical techniques, including those set forth previously. Next in step 524, the codec encodes packet structure$_j$. As will be appreciated, the comparison steps 508 and 516 and encoding step 524 can be conducted in any order, including in parallel. The counter is incremented in step 528, and in step 532, the codec determines whether or not there is a next packet structure$_j$.

The operation of the acoustic prioritization agent 232 will now be discussed with reference to with FIGS. 2 and 6.

In step 600, the acoustic prioritizing agent 232 gets packet$_j$ (which corresponds to packet structure$_j$). In step 604, the agent 232 determines whether VAD 10 categorized packet structure$_j$ as "silence". When the corresponding packet structure$_j$ has been categorized as "silence", the agent 232, in step 608, processes packet$_j$ based on the level of confidence reported by the VAD 10 for packet structure$_j$.

The processing of "silent" packets can take differing forms. In one configuration, a packet having a corresponding level of confidence less than a selected silence threshold Y is dropped. In other words, the agent requests the packet protocol interface 18 to prevent packet$_j$ from being transported across the network. A "silence" packet having a corresponding level of confidence more than the selected threshold is sent. The priority of the packet can be set at a lower level than the priorities of "nonsilence" packets. "Priority" can take many forms depending on the particular protocols and network topology in use. For example, priority can refer to a service class or type (for protocols such as Differentiated Services and Internet Integrated Services), and priority level (for protocols such as Ethernet). For example, "silent" packets can be sent via the assured forwarding class while "nonsilence" packets are sent via the expedited forwarding (code point) class. This can be done, for example, by suitably marking, in the Type of Service or Traffic Class fields, as appropriate. In yet another configuration, a value marker indicative of the importance of the packet to voice quality is placed in the header and/or payload of the packet. The value marker can be used by intermediate nodes, such as routers, and/or by the buffer manager 332 (FIG. 3) to discard packets in appropriate applications. For example, when traffic congestion is found to exist using any of the parameters set forth above, value markers having values less than a predetermined level can be dropped during transit or after reception. This configuration is discussed in detail with reference to FIGS. 7 and 8. Multiple "silence" packet thresholds can be employed for differing types of packet processing, depending on the application. As will be appreciated, the various thresholds can vary dynamically depending on the degree of network congestion as set forth previously.

When the corresponding packet structure$_j$ has been categorized as "nonsilence", the agent 232, in step 618, determines whether the degree of similarity between the corresponding packet structure$_j$ and packet structure$_{j-1}$ (as determined by the codec 14) is greater than or equal to a selected similarity threshold X. If so, the agent 232 proceeds to step 628 (discussed below). If not, the agent 232 proceeds to step 624. In step 624, the agent determines whether the degree of similarity between the corresponding packet structure$_j$ and packet structure$_{j+1}$ (as determined by the codec 14) is greater than or equal to the selected similarity threshold X. If so, the agent 232 proceeds to step 628.

In step 628, the agent 232 processes packet$_j$ based on the magnitude of the degree of similarity and/or on the treatment of the temporally adjacent packet$_{j-1}$. As in the case of "silent" packets, the processing of similar packets can take differing forms. In one configuration, a packet having a degree of similarity more than the selected similarity threshold X is dropped. In other words, the agent requests the packet protocol interface 18 to prevent packet$_j$ from being transported across the network. The packet loss concealment agent 328 (FIG. 3) in the second communication device 300 will reconstruct the dropped packet. In that event, the magnitude of X is determined by the packet reconstruction efficiency and accuracy of the packet loss concealment algorithm. If the preceding packet$_{j-1}$ were dropped, packet$_j$ may be forwarded, as the dropping of too many consecutive packets can have a detrimental impact on the efficiency and accuracy of the packet loss concealment agent 328. In another configuration, multiple transmission priorities are used depending on the degree of similarity. For example, a packet having a degree of similarity more than the selected threshold is sent with a lower priority. The priority of the packet is set at a lower level than the priorities of dissimilar packets. As noted above, "priority" can take many forms depending on the particular protocols and network topology in use. In yet another configuration, the value marker indicative of the importance of the packet to voice quality is placed in the header and/or payload of the packet. The value marker can be used as set forth previously and below to cause the dropping of packets having value markers below one or more selected marker value thresholds. Multiple priority levels can be employed for multiple similarity thresholds, depending on the application. As will be appreciated, the various similarity and marker value thresholds can vary dynamically depending on the degree of network congestion as set forth previously.

After steps 608 and 628 and in the event in step 624 that the similarity between the corresponding packet structure$_j$ and packet structure$_{j+1}$ (as determined by the codec 14) is less than the selected similarity threshold X, the agent 232 proceeds to step 612. In step 612, the counter j is incremented by one. In step 616, the agent 232 determines whether there is a next packet$_j$. When there is a next packet$_j$, the agent 232 proceeds to and repeats step 600. When there is no next packet, the agent 232 proceeds to step 632 and terminates operation until more packet structures are received for packetization.

The operation of the buffer manager 332 will now be described with reference to FIGS. 3 and 7-8. In step 800, the buffer manager 332 determines whether the buffer delay (or length) is greater than or equal to a buffer threshold Y. If not, the buffer manager 332 repeats step 800. If so, the buffer manager 332 in step 804 gets packet$_k$ from the receive buffer 32. Initially, of course the counter k is set to 1 to denote the packet in the first position in the receive buffer (or at the head of the buffer). Alternatively, the manager 332 can retrieve the last packet in the receive buffer (or at the tail of the buffer).

In step 808, the manager 332 determines if the packet is expendable; that is, whether the value of the value marker is less than (or greater depending on the configuration) a selected value threshold. When the value of the value marker is less than the selected value threshold, the packet$_k$ in step 812 is discarded or removed from the buffer and in step 816 the surrounding enqueued packets are time compressed around the slot previously occupied by packet$_k$.

Figure 7:
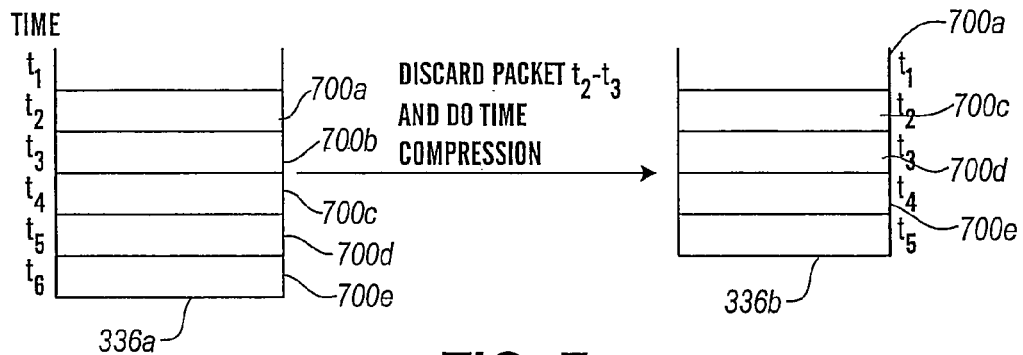
FIG. 7 is a block diagram illustrating time compression according to a fourth embodiment of the present invention.

Time compression is demonstrated with reference to FIG. 7. The buffer 32 is shown as having various packets 700a-e, each packet payload representing a corresponding time interval of the voice stream. If the manager determines that packet 700b (which corresponds to the time interval $t_2$ to $t_3$) is expendable, the manager 332 first removes the packet 700b from the queue 32a and then moves packets 700c-e ahead in the queue. To perform time compression, the packet counters for packets 700c-e are decremented such that packet 700c now occupies the time slot $t_2$ to $t_3$, packet 700d time slot $t_2$ to $t_3$, and packet 700d time slot $t_3$ to $t_4$. In this manner, the packet loss concealment agent 328 will be unaware that packet 700b has been discarded and will not attempt to reconstruct the packet. In contrast, if a packet is omitted from an ordering of packets, the packet loss concealment agent 328 will recognize the omission by the break in the packet counter sequence. The agent 328 will then attempt to reconstruct the packet.

Returning again to FIG. 8, the manager 332 in step 820 increments the counter k and repeats step 800 for the next packet.

A number of variations and modifications of the invention can be used. It would be possible to provide for some features of the invention without providing others.

For example in one alternative embodiment, the prioritizing agent's priority assignment based on the type of "silence" detected can be performed by the VAD 200.

In another alternative embodiment though FIG. 2 is suitable for use with a VoIP architecture using Embedded Communication Objects interworking with a telephone system and packet network, it is to be understood that the configuration of the VAD 10, codec 14, prioritizing agent 232 and/or buffer manager 332 of the present invention can vary significantly depending upon the application and the protocols employed. For example, the prioritizing agent 232 can be included in an alternate location in the embodiment of FIG. 2, and the buffer manager in an alternate location in the embodiment of FIG. 3. The prioritizing agent and/or buffer manager can interface with different components than those shown in FIG. 2 for other types of user interfaces, such as a PC, wireless telephone, and laptop. The prioritizing agent and/or buffer manager can be included in an intermediate node between communication devices, such as in a switch, transcoding device, translating device, router, gateway, etc.

In another embodiment, the packet comparison operation of the codec is performed by another component. For example, the VAD and/or acoustic prioritization agent performs these functions.

In another embodiment, the level of confidence determination of the VAD is performed by another component. For example, the codec and/or acoustic prioritization agent performs these functions.

In yet a further embodiment, the codec and/or VAD, during packet structure processing attempt to identify acoustic events of great importance, such as plosives. When such acoustic events are identified (e.g., when the difference identified by the codec exceeds a predetermined threshold), the acoustic prioritizing agent 232 can cause the packets corresponding to the packet structures to have extremely high priorities and/or be marked with value markers indicating that the packet is not to be dropped under any circumstances. The loss of a packet containing such important acoustic events often cannot be reconstructed accurately by the packet loss concealment agent 328.

In yet a further embodiment, the analyses performed by the codec, VAD, and acoustic prioritizing agent are performed on a frame level rather than a packet level. "Silent" frames and/or acoustically similar frames are omitted from the packet payloads. The procedural mechanisms for these embodiments are similar to that for packets in FIGS. 4 and 5. In fact, the replacement of "frame" for "packet structure" and "packet" in FIGS. 4 and 5 provides a configuration of this embodiment.

Figure 6:
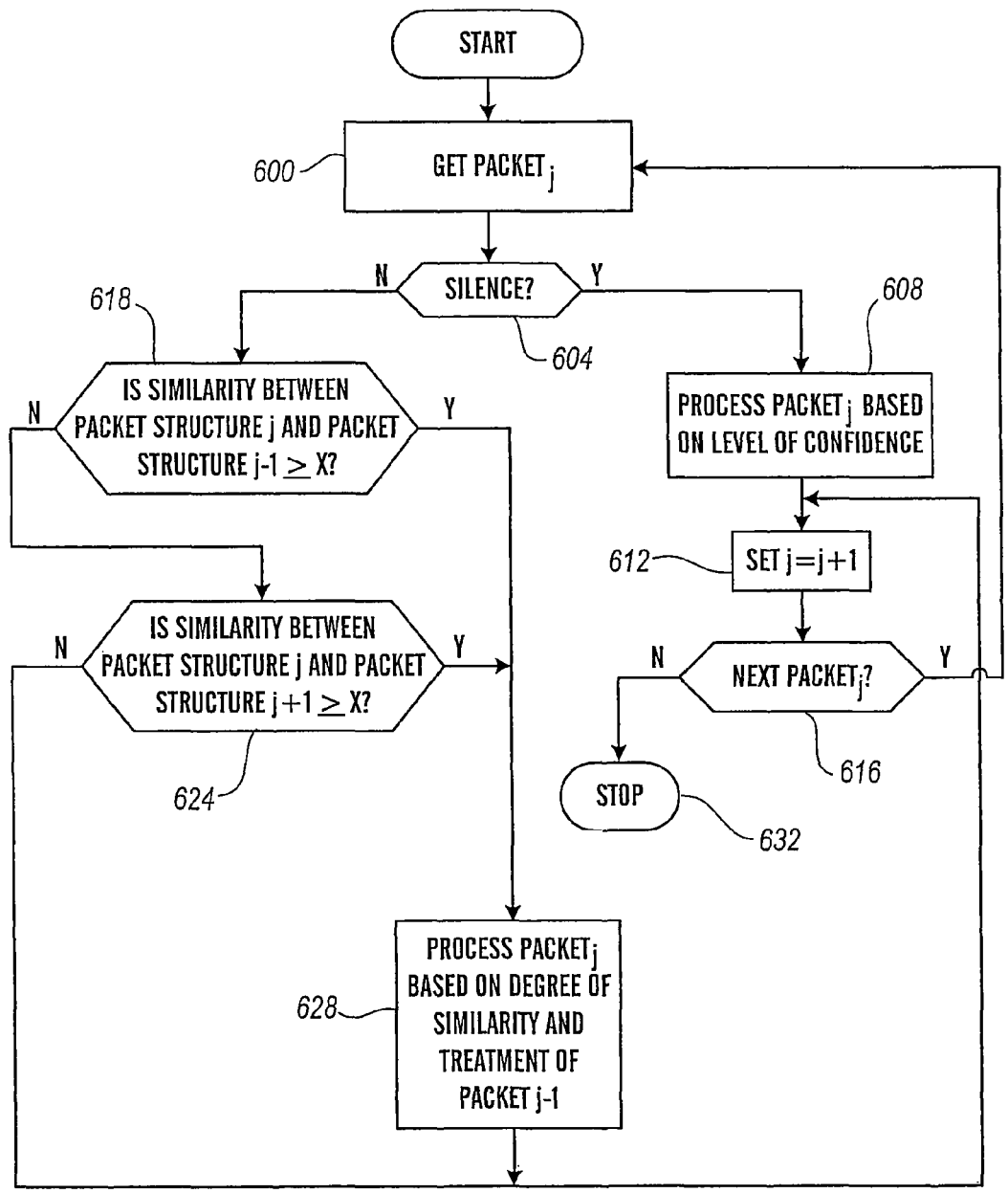
FIG. 6 is a flow chart of a packet prioritizing algorithm according to a second embodiment of the present invention.
Figure 8:
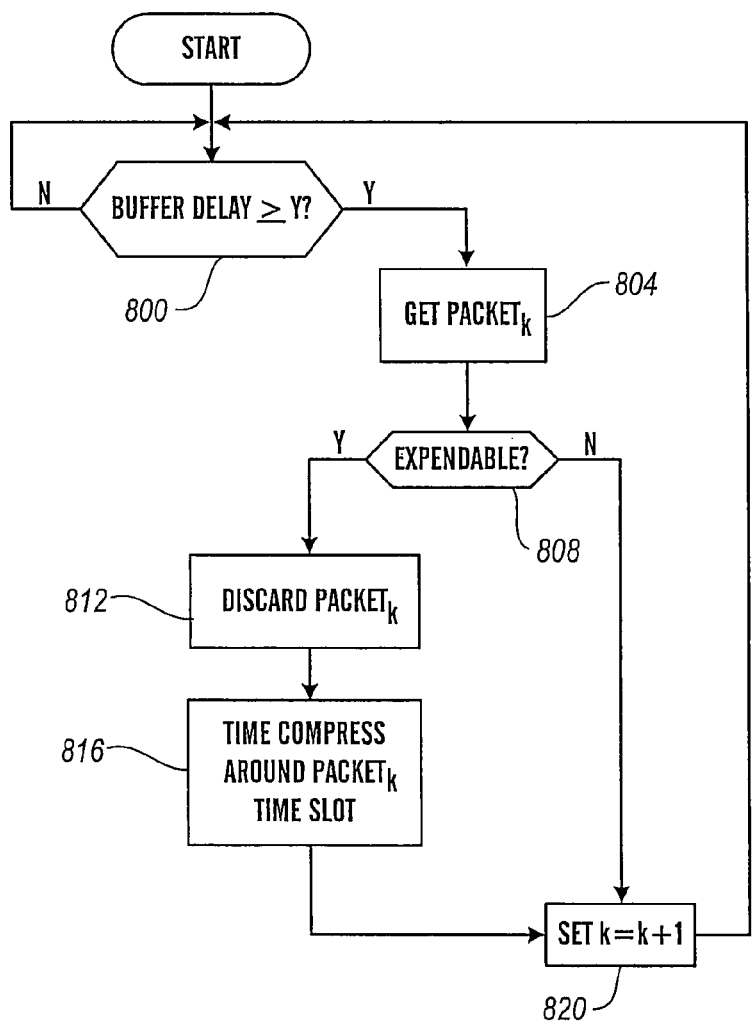
FIG. 8 is a flow chart of a buffer management algorithm according to the fourth embodiment of the present invention.

In yet another embodiment, the algorithms of FIGS. 6 and 8 are state driven. In other words, the algorithms are not triggered until network congestion exceeds a predetermined amount. The trigger for the state to be entered can be based on any of the performance parameters set forth above increasing above or decreasing below predetermined thresholds.

In yet a further embodiment, the dropping of packets based on the value of the value marker is performed by an intermediate node, such as a router. This embodiment is particularly useful in a network employing any of the Multi Protocol Labeling Switching, ATM, and Integrated Services Controlled Load and Differentiate Services.

In yet a further embodiment, the positions of the codec and adaptive playout unit in FIG. 3 are reversed. Thus, the receive buffer 32 contains encoded packets rather than decoded packets.

In yet a further embodiment, the acoustic prioritization agent 232 processes packet structures before and/or after encryption.

In yet a further embodiment, a value marker is not employed and the buffer manager itself performs the packet/frame comparison to identify acoustically similar packets that can be expended in the event that buffer length/delay reaches undesired levels.

In other embodiments, the VAD 10, codec 14, acoustic prioritization agent 232, and/or buffer manager 332 are implemented as software and/or hardware, such as a logic circuit, e.g., an Application Specific Integrated Circuit or ASIC.

The present invention, in various embodiments, includes components, methods, processes, systems and/or apparatus substantially as depicted and described herein, including various embodiments, subcombinations, and subsets thereof Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for processing voice communications over a data network, comprising:
  receiving a voice stream from a first user, the voice stream comprising a plurality of temporally distinct segments associated with a plurality of packets and the voice stream being a part of a session between at least the first user and a second user, wherein the session has an associated at least one of a jitter value, a latency value, a number of missing packets, a number of packets received out-of-order, a processing delay, a propagation delay, a receive buffer delay, and a number of packets enqueued in a receive buffer and
  comparing the at least one of a jitter value, a latency value, a number of missing packets, a number of packets received out-of-order, a processing delay, a propagation delay, a receive buffer delay, and a number of packets enqueued in a receive buffer with a predetermined threshold;
    (i) when the at least one of a jitter value, a latency value, a number of missing packets, a number of packets received out-of-order, a processing delay, a propagation delay, a receive buffer delay, and a number of packets enqueued in a receive buffer exceeds the predetermined threshold, not transmitting at least some of the plurality of packets and
    (ii) when the at least one of a jitter value, a latency value, a number of missing packets, a number of packets received out-of-order, a processing delay, a propagation delay, a receive buffer delay, and a number of packets enqueued in a receive buffer is less than the predetermined threshold, transmitting the at least some of the plurality of packets; and
  further comprising at least one of the following steps:
    determining whether or not the contents of a selected first segment of the plurality of temporally distinct segments of the voice stream are the product of voice activity and, when the contents are determined not to be the product of voice activity, indicate a level of confidence that the voice activity determination is accurate; and
    comparing the selected first segment with a second segment of the plurality of temporally distinct segments to determine a degree of acoustic similarity between the first and second segments, wherein the processing of the first segment is based on at least one of the level of confidence, the type of voice activity, and the degree of acoustic similarity.

2. The method of claim 1, further comprising:
  based on the at least one of the level of confidence, type of voice activity and the degree of acoustic similarity, assigning an importance to the first segment.

3. The method of claim 2, wherein the importance is a value marker and further comprising:
  incorporating the value marker into a first packet comprising the first segment.

4. The method of claim 2, wherein the importance is a service class assigned to a first packet comprising the first segment.

5. The method of claim 2, wherein the importance is a transmission priority assigned to a first packet comprising the first segment.

6. The method of claim 1, wherein in the processing step a first packet comprising the first segment is not transmitted when the at least one of the level of confidence and the degree of acoustic similarity is one of less than and greater than a predetermined threshold.

7. The method of claim 6, wherein a first packet associated with the first segment is not transmitted and further comprising:

later reconstructing the first segment with a packet loss concealment algorithm.

8. The method of claim 1, wherein the type of voice activity is a plosive.

9. The method of claim 1, wherein the at least one step is the determining step and wherein the level of confidence is based on a degree of similarity of temporally adjacent packets.

10. The method of claim 1, wherein the at least one step is the determining step and wherein the level of confidence is based on the significance of audio in a packet to receiver understanding or fidelity.

11. The method of claim 1, wherein the at least one step is the determining step and wherein the level of confidence permits a voice activity detector to provide a ternary output.

\* \* \* \* \*